(12) United States Patent
Ho et al.

(10) Patent No.: US 8,867,440 B2
(45) Date of Patent: Oct. 21, 2014

(54) POWER HEADROOM REPORTING FOR MULTICARRIER LTE SYSTEMS

(75) Inventors: Sai Yiu Duncan Ho, San Diego, CA (US); Jelena M. Damnjanovic, Del Mar, CA (US); Aleksandar Damnjanovic, Del Mar, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 296 days.

(21) Appl. No.: 13/115,844

(22) Filed: May 25, 2011

(65) Prior Publication Data

US 2011/0292874 A1 Dec. 1, 2011

Related U.S. Application Data

(60) Provisional application No. 61/349,671, filed on May 28, 2010.

(51) Int. Cl.
| | | |
|---|---|---|
| H04W 4/00 | (2009.01) | |
| H04B 7/00 | (2006.01) | |
| H04B 7/185 | (2006.01) | |
| H04B 7/216 | (2006.01) | |
| H04J 4/00 | (2006.01) | |
| H04W 52/42 | (2009.01) | |
| H04W 52/36 | (2009.01) | |
| H04W 52/14 | (2009.01) | |
| H04W 52/28 | (2009.01) | |
| H04W 52/34 | (2009.01) | |

(52) U.S. Cl.
CPC ......... *H04W 52/365* (2013.01); *H04W 52/146* (2013.01); *H04W 52/286* (2013.01); *H04W 52/42* (2013.01); *H04W 52/34* (2013.01)
USPC ........... 370/328; 370/277; 370/318; 370/320; 370/436

(58) Field of Classification Search
CPC ..... H04W 80/04; H04W 80/12; H04W 52/46; H04L 5/14; H04B 7/18543; H04B 7/216
USPC ........................................................ 370/328
See application file for complete search history.

(56) References Cited

U.S. PATENT DOCUMENTS

2010/0296470 A1* 11/2010 Heo et al. ...................... 370/329

(Continued)

FOREIGN PATENT DOCUMENTS

JP       2012522473 A      9/2012

(Continued)

OTHER PUBLICATIONS

International Search Report and Written Opinion—PCT/US2011/038396, ISA/EPO—Aug. 26, 2011.

(Continued)

*Primary Examiner* — Faruk Hamza
*Assistant Examiner* — Abu-Sayeed Haque
(74) *Attorney, Agent, or Firm* — Larry Moskowitz

(57) ABSTRACT

A method, an apparatus, and a computer program product for wireless communication are provided. The apparatus maintains at least one PHR trigger for triggering communication of a PHR for a plurality of component carriers. In addition, the apparatus communicates the PHR for at least one of the component carriers upon the at least one PHR trigger being triggered. The communicated PHR may be an aggregated PHR that includes power headroom information on the PCC and activated SCCs. The communicated PHR may further include an index associating information in the PHR to a corresponding component carrier. The communicated PHR may further include information indicating use of a PUSCH reference for computing the PHR for the at least one of the component carriers on which there is no PUSCH transmission.

20 Claims, 18 Drawing Sheets

(56) References Cited

U.S. PATENT DOCUMENTS

| | | | |
|---|---|---|---|
| 2011/0292874 A1* | 12/2011 | Ho et al. | 370/328 |
| 2012/0046064 A1* | 2/2012 | Baldemair et al. | 455/522 |
| 2012/0082041 A1* | 4/2012 | Damnjanovic et al. | 370/252 |
| 2012/0243431 A1* | 9/2012 | Chen et al. | 370/252 |
| 2013/0136069 A1* | 5/2013 | Baldemair et al. | 370/329 |

FOREIGN PATENT DOCUMENTS

| | | |
|---|---|---|
| JP | 2013507069 A | 2/2013 |
| WO | 2008155469 A1 | 12/2008 |
| WO | 2010129146 A2 | 11/2010 |
| WO | 2011041666 A2 | 4/2011 |

OTHER PUBLICATIONS

Motorola: "Power Headroom Reporting for CA" 3GPP Draft; R2-102762, 3rd Generation Partnership Project (3GPP), Mobile Competence Centre ; 650, Route Des Lucioles ; F-06921 Sophia-Antipolis Cedex ; France, vol. RAN WG2, no. Montreal, Canada; 20100510, May 4, 2010, XP050423121, [retrieved on May 4, 2010].

Rani: "LS on power headroom reporting for carrier aggregation", 3GPP Draft; R4-102314, 3rd Generation Partnership Project (3GPP), Mobile Competence Centre ; 650, Route Des Lucioles ; F-06921 Sophia-Antipolis Cedex ; France, vol. RAN WG4, no. Montreal, Canada; 20100510, May 20, 2010, XP050427214, [retrieved on May 20, 2010].

* cited by examiner

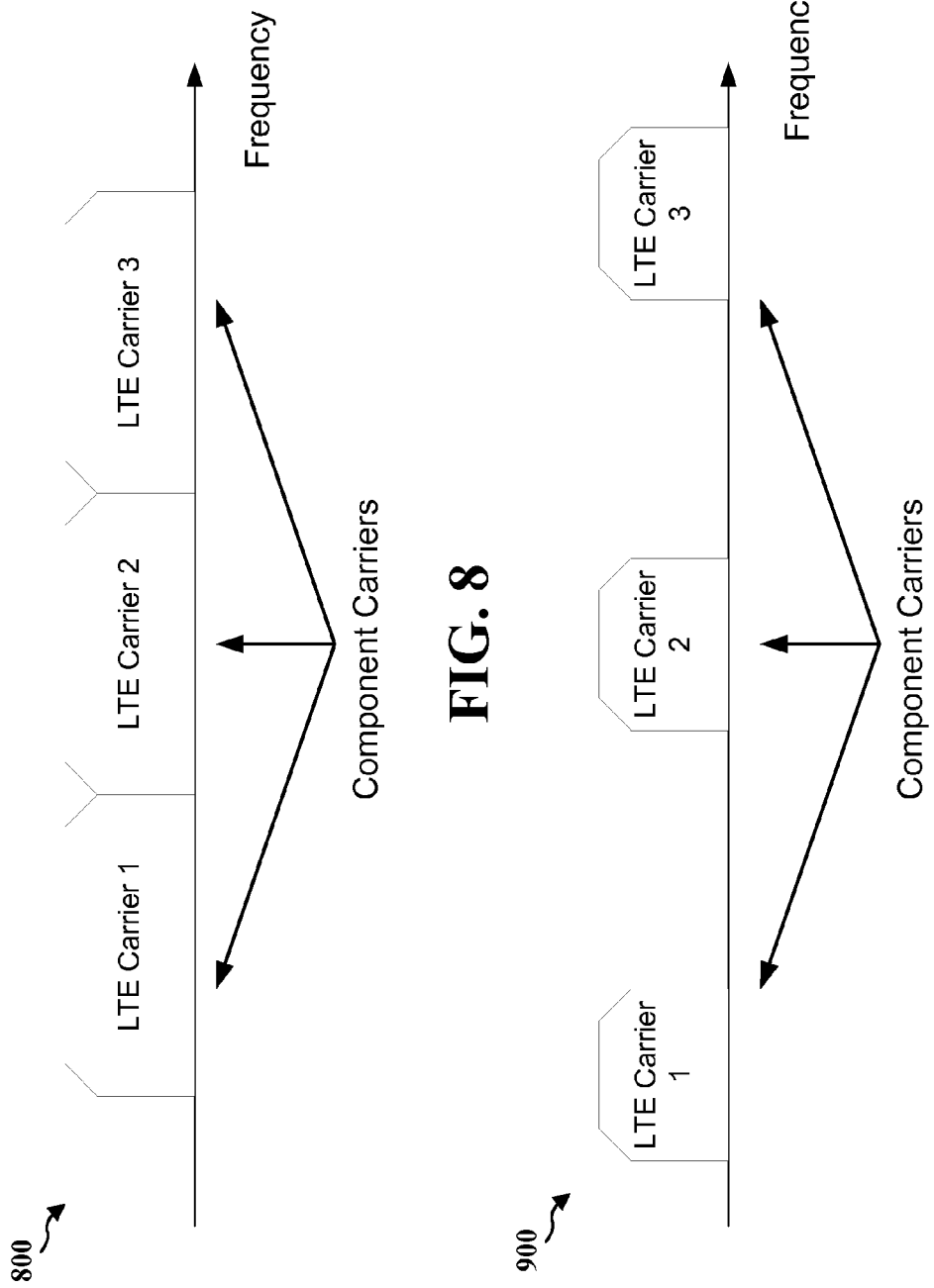

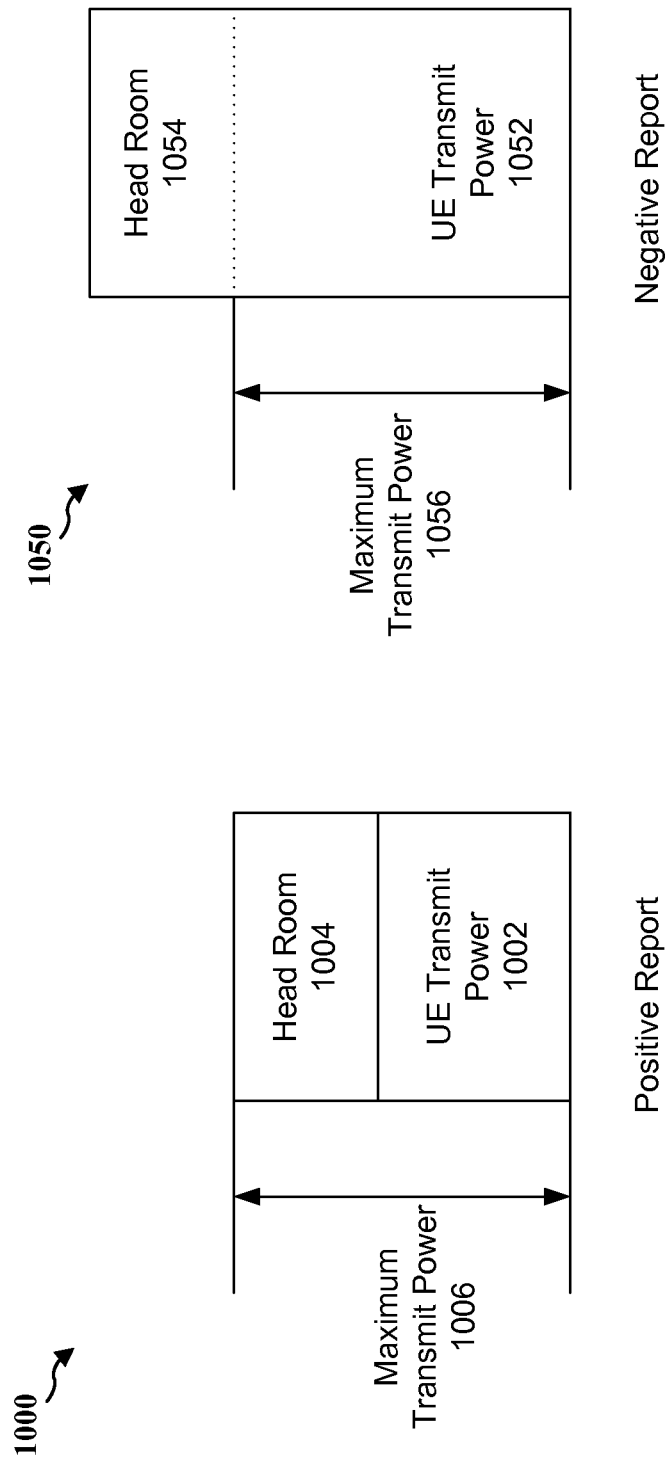

POWER HEADROOM REPORTING FOR MULTICARRIER LTE SYSTEMS

CROSS-REFERENCE TO RELATED APPLICATION(S)

This application claims the benefit of U.S. Provisional Application Ser. No. 61/349,671, entitled "Power Headroom Reporting for Multicanier LTE Systems" and filed on May 28, 2010, which is expressly incorporated by reference herein in its entirety.

BACKGROUND

1. Field

The present disclosure relates generally to communication systems, and more particularly, to power headroom reporting for multicarrier Long Term Evolution (LTE) systems.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is LTE. LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus for wireless communication are provided. The apparatus maintains at least one power headroom report (PHR) trigger for triggering communication of a PHR for a plurality of component carriers. In addition, the apparatus communicates the PHR for at least one of the component carriers upon the at least one PHR trigger being triggered.

BRIEF DESCRIPTION OF THE DRAWINGS

FIG. 8 is a diagram illustrating continuous carrier aggregation.

FIG. 9 is a diagram illustrating non-continuous carrier aggregation.

FIG. 10 is a diagram illustrating a positive PHR.

FIG. 11 is a diagram illustrating a negative PHR.

DETAILED DESCRIPTION

Figure 1:
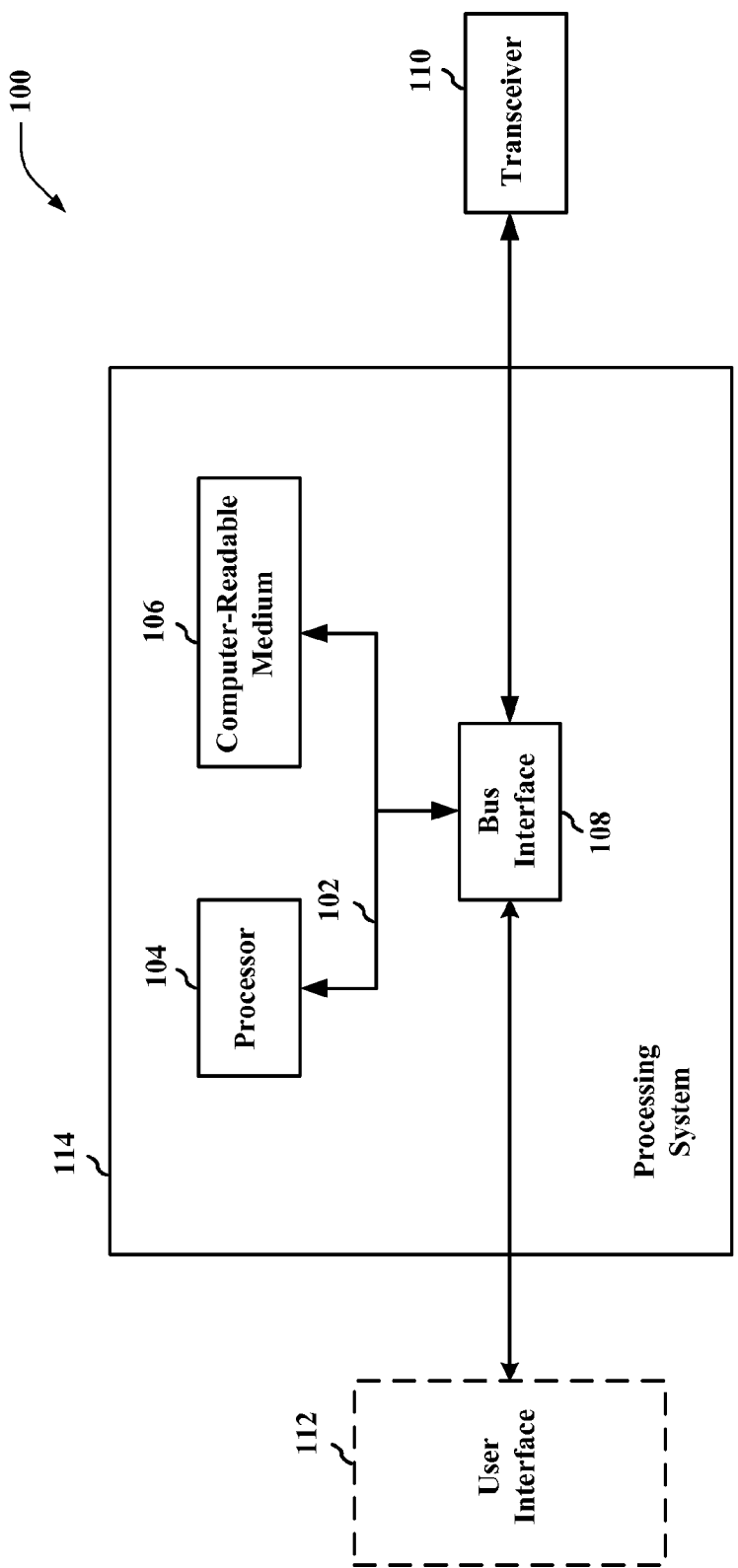
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a conceptual diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
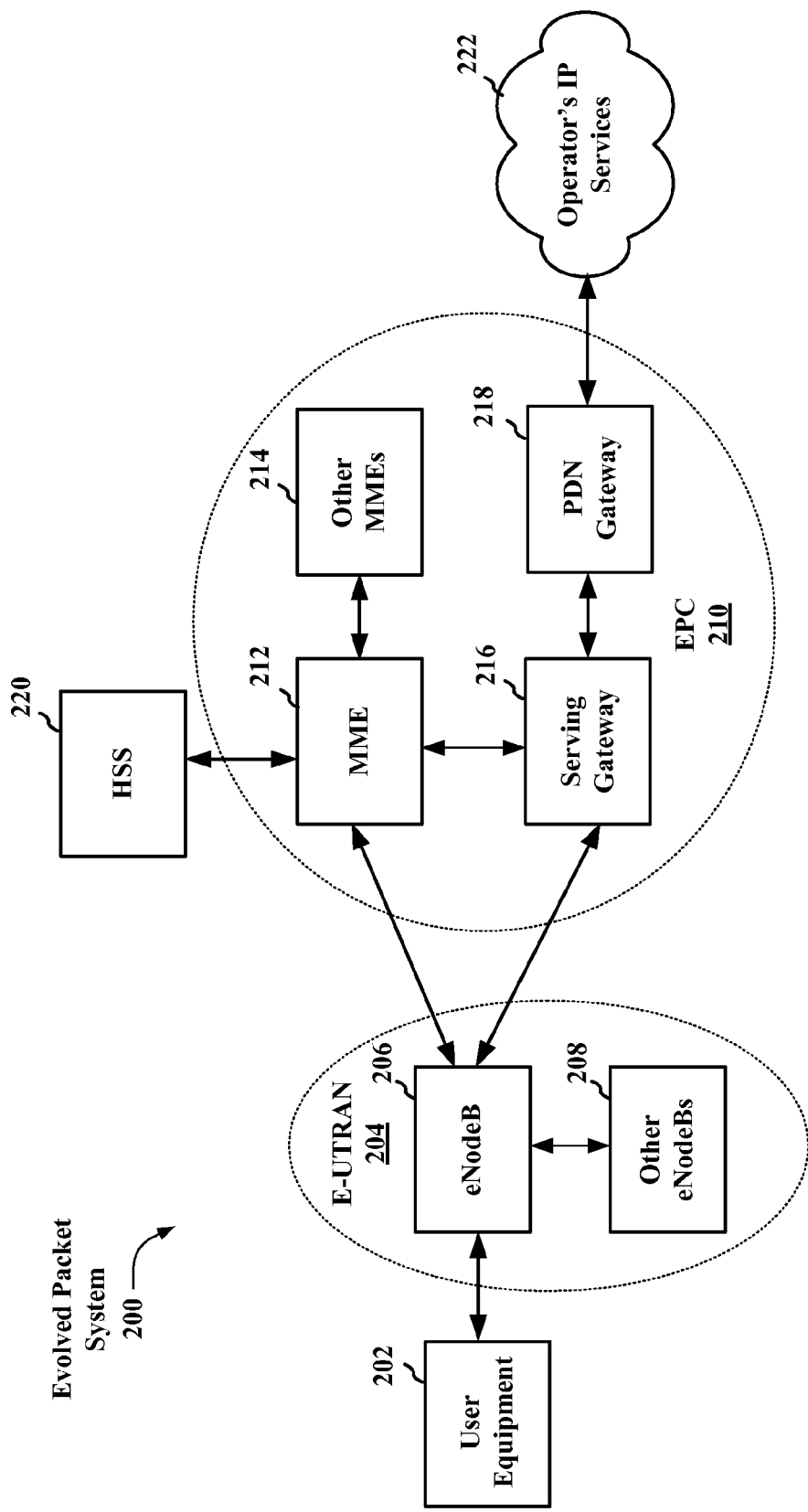
FIG. 2 is a diagram illustrating an example of a network architecture.

FIG. 2 is a diagram illustrating an LTE network architecture 200 employing various apparatuses 100 (See FIG. 1). The LTE network architecture 200 may be referred to as an Evolved Packet System (EPS) 200. The EPS 200 may include one or more user equipment (UE) 202, an Evolved UMTS Terrestrial Radio Access Network (E-UTRAN) 204, an Evolved Packet Core (EPC) 210, a Home Subscriber Server (HSS) 220, and an Operator's IP Services 222. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 206 and other eNBs 208. The eNB 206 provides user and control plane protocol terminations toward the UE 202. The eNB 206 may be connected to the other eNBs 208 via an X2 interface (i.e., backhaul). The eNB 206 may also be referred to by those skilled in the art as a base station, a base transceiver station, a radio base station, a radio transceiver, a transceiver function, a basic service set (BSS), an extended service set (ESS), or some other suitable terminology. The eNB 206 provides an access point to the EPC 210 for a UE 202. Examples of UEs 202 include a cellular phone, a smart phone, a session initiation protocol (SIP) phSone, a laptop, a personal digital assistant (PDA), a satellite radio, a global positioning system, a multimedia device, a video device, a digital audio player (e.g., MP3 player), a camera, a game console, or any other similar functioning device. The UE 202 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 206 is connected by an S1 interface to the EPC 210. The EPC 210 includes a Mobility Management Entity (MME) 212, other MMEs 214, a Serving Gateway 216, and a Packet Data Network (PDN) Gateway 218. The MME 212 is the control node that processes the signaling between the UE 202 and the EPC 210. Generally, the MME 212 provides bearer and connection management. All user IP packets are transferred through the Serving Gateway 216, which itself is connected to the PDN Gateway 218. The PDN Gateway 218 provides UE IP address allocation as well as other functions. The PDN Gateway 218 is connected to the Operator's IP Services 222. The Operator's IP Services 222 include the Internet, the Intranet, an IP Multimedia Subsystem (IMS), and a PS Streaming Service (PSS).

Figure 3:
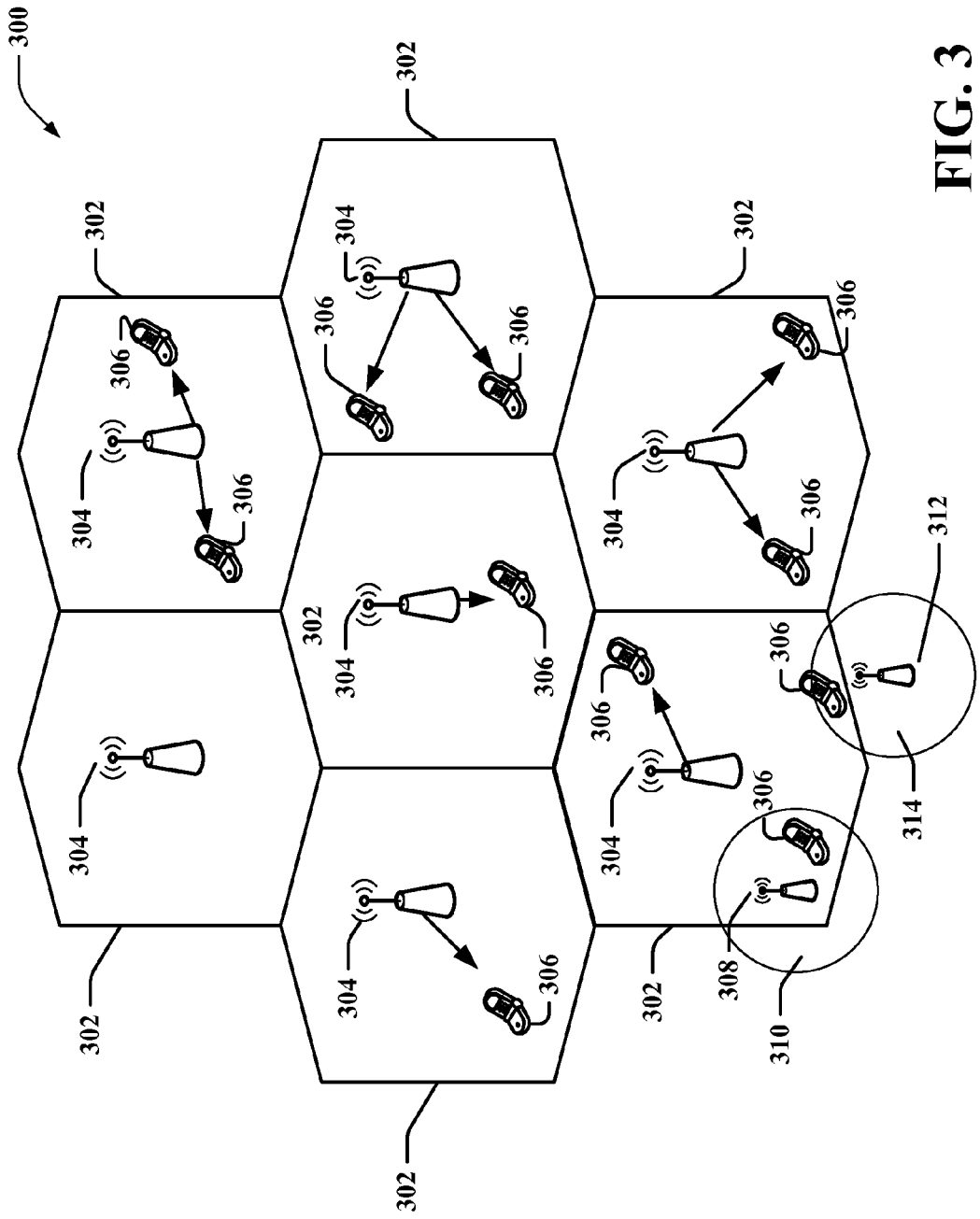
FIG. 3 is a diagram illustrating an example of an access network.

FIG. 3 is a diagram illustrating an example of an access network in an LTE network architecture. In this example, the access network 300 is divided into a number of cellular regions (cells) 302. One or more lower power class eNBs 308, 312 may have cellular regions 310, 314, respectively, that overlap with one or more of the cells 302. The lower power class eNBs 308, 312 may be femto cells (e.g., home eNBs (HeNBs)), pico cells, or micro cells. A higher power class or macro eNB 304 is assigned to a cell 302 and is configured to provide an access point to the EPC 210 for all the UEs 306 in the cell 302. There is no centralized controller in this example of an access network 300, but a centralized controller may be used in alternative configurations. The eNB 304 is responsible for all radio related functions including radio bearer control, admission control, mobility control, scheduling, security, and connectivity to the serving gateway 216 (see FIG. 2).

The modulation and multiple access scheme employed by the access network 300 may vary depending on the particular telecommunications standard being deployed. In LTE applications, OFDM is used on the DL and SC-FDMA is used on the UL to support both frequency division duplexing (FDD)

and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNB 304 may have multiple antennas supporting MIMO technology. The use of MIMO technology enables the eNB 304 to exploit the spatial domain to support spatial multiplexing, beamforming, and transmit diversity.

Spatial multiplexing may be used to transmit different streams of data simultaneously on the same frequency. The data steams may be transmitted to a single UE 306 to increase the data rate or to multiple UEs 306 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 306 with different spatial signatures, which enables each of the UE(s) 306 to recover the one or more data streams destined for that UE 306. On the uplink, each UE 306 transmits a spatially precoded data stream, which enables the eNB 304 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PARR).

Figure 4:
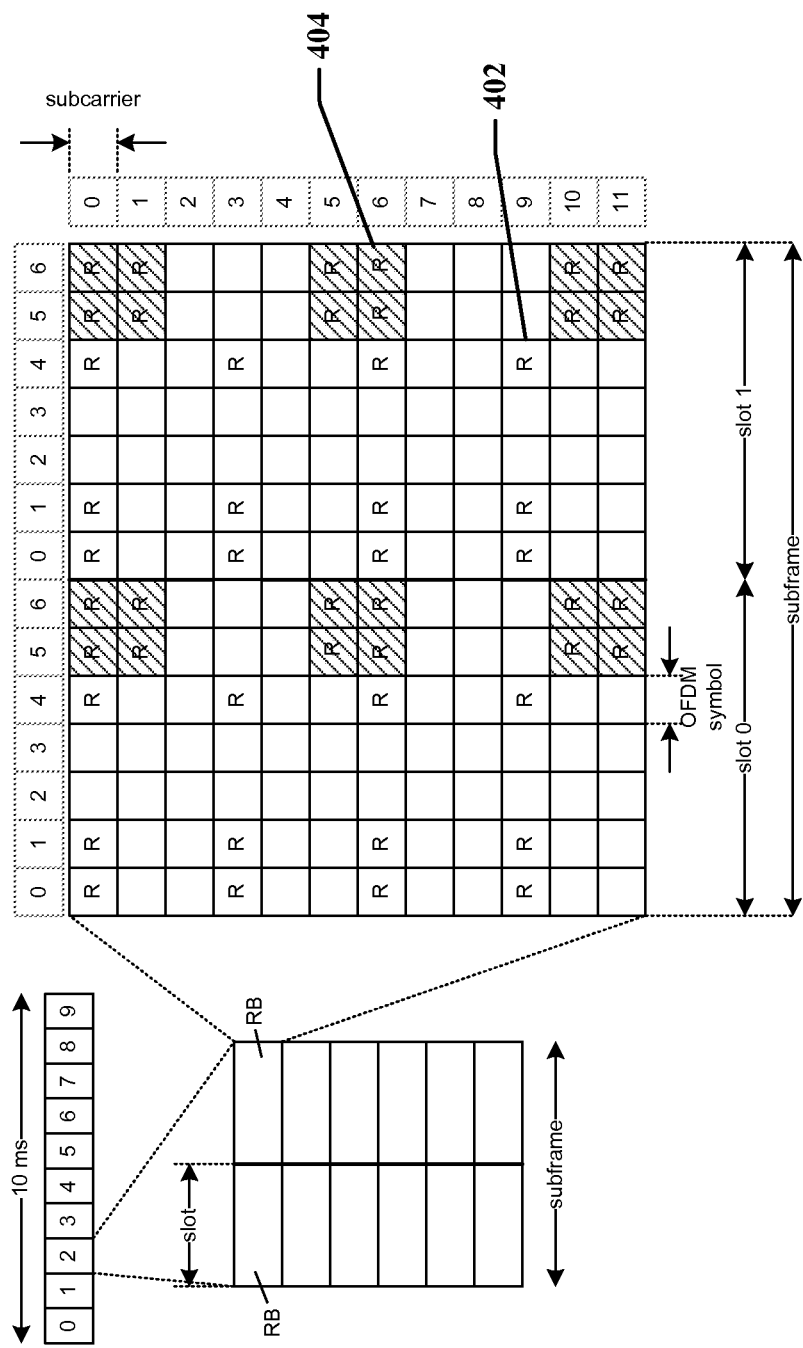
FIG. 4 is a diagram illustrating an example of a frame structure for use in an access network.

Various frame structures may be used to support the DL and UL transmissions. An example of a DL frame structure will now be presented with reference to FIG. 4. However, as those skilled in the art will readily appreciate, the frame structure for any particular application may be different depending on any number of factors. In this example, a frame (10 ms) is divided into 10 equally sized sub-frames. Each sub-frame includes two consecutive time slots.

A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. Some of the resource elements, as indicated as R 402, 404, include DL reference signals (DL-RS). The DL-RS include Cell-specific RS (CRS) (also sometimes called common RS) 402 and UE-specific RS (UE-RS) 404. UE-RS 404 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 5:
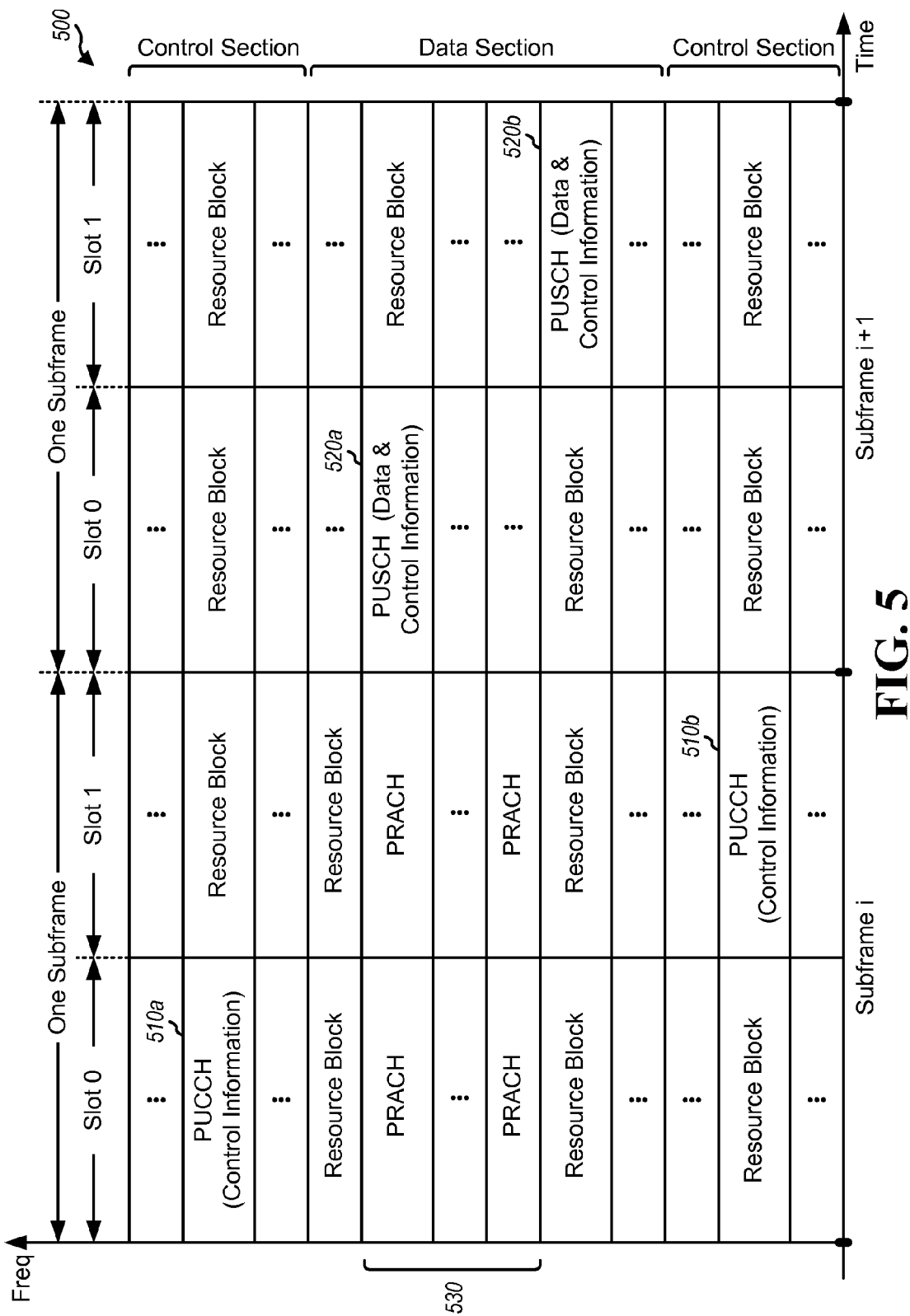
FIG. 5 shows an exemplary format for the UL in LTE.

An example of a UL frame structure 500 will now be presented with reference to FIG. 5. FIG. 5 shows an exemplary format for the UL in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 5 results in the data section including contiguous subcarriers, which may allow a single UE to be assigned all of the contiguous subcarriers in the data section.

A UE may be assigned resource blocks 510a, 510b in the control section to transmit control information to an eNB. The UE may also be assigned resource blocks 520a, 520b in the data section to transmit data to the eNB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. A UL transmission may span both slots of a subframe and may hop across frequency as shown in FIG. 5.

As shown in FIG. 5, a set of resource blocks may be used to perform initial system access and achieve UL synchronization in a physical random access channel (PRACH) 530. The PRACH 530 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) and a UE can make only a single PRACH attempt per frame (10 ms).

Figure 6:
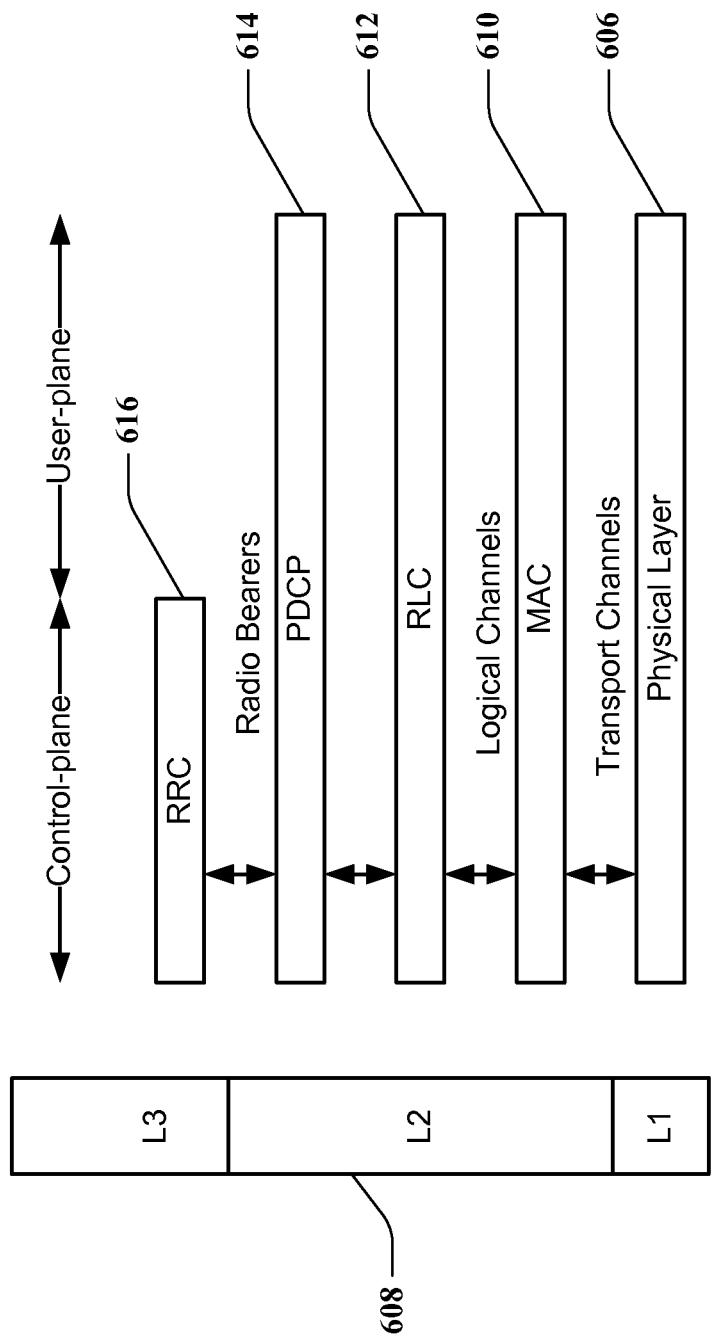
FIG. 6 is a diagram illustrating an example of a radio protocol architecture for the user and control plane.

The radio protocol architecture may take on various forms depending on the particular application. An example for an LTE system will now be presented with reference to FIG. 6. FIG. 6 is a conceptual diagram illustrating an example of the radio protocol architecture for the user and control planes.

Turning to FIG. 6, the radio protocol architecture for the UE and the eNB is shown with three layers: Layer 1, Layer 2, and Layer 3. Layer 1 is the lowest layer and implements various physical layer signal processing functions. Layer 1 will be referred to herein as the physical layer 606. Layer 2

(L2 layer) 608 is above the physical layer 606 and is responsible for the link between the UE and eNB over the physical layer 606.

In the user plane, the L2 layer 608 includes a media access control (MAC) sublayer 610, a radio link control (RLC) sublayer 612, and a packet data convergence protocol (PDCP) 614 sublayer, which are terminated at the eNB on the network side. Although not shown, the UE may have several upper layers above the L2 layer 608 including a network layer (e.g., IP layer) that is terminated at the PDN gateway 208 (see FIG. 2) on the network side, and an application layer that is terminated at the other end of the connection (e.g., far end UE, server, etc.).

The PDCP sublayer 614 provides multiplexing between different radio bearers and logical channels. The PDCP sublayer 614 also provides header compression for upper layer data packets to reduce radio transmission overhead, security by ciphering the data packets, and handover support for UEs between eNBs. The RLC sublayer 612 provides segmentation and reassembly of upper layer data packets, retransmission of lost data packets, and reordering of data packets to compensate for out-of-order reception due to hybrid automatic repeat request (HARQ). The MAC sublayer 610 provides multiplexing between logical and transport channels. The MAC sublayer 610 is also responsible for allocating the various radio resources (e.g., resource blocks) in one cell among the UEs. The MAC sublayer 610 is also responsible for HARQ operations.

In the control plane, the radio protocol architecture for the UE and eNB is substantially the same for the physical layer 606 and the L2 layer 608 with the exception that there is no header compression function for the control plane. The control plane also includes a radio resource control (RRC) sublayer 616 in Layer 3. The RRC sublayer 616 is responsible for obtaining radio resources (i.e., radio bearers) and for configuring the lower layers using RRC signaling between the eNB and the UE.

Figure 7:
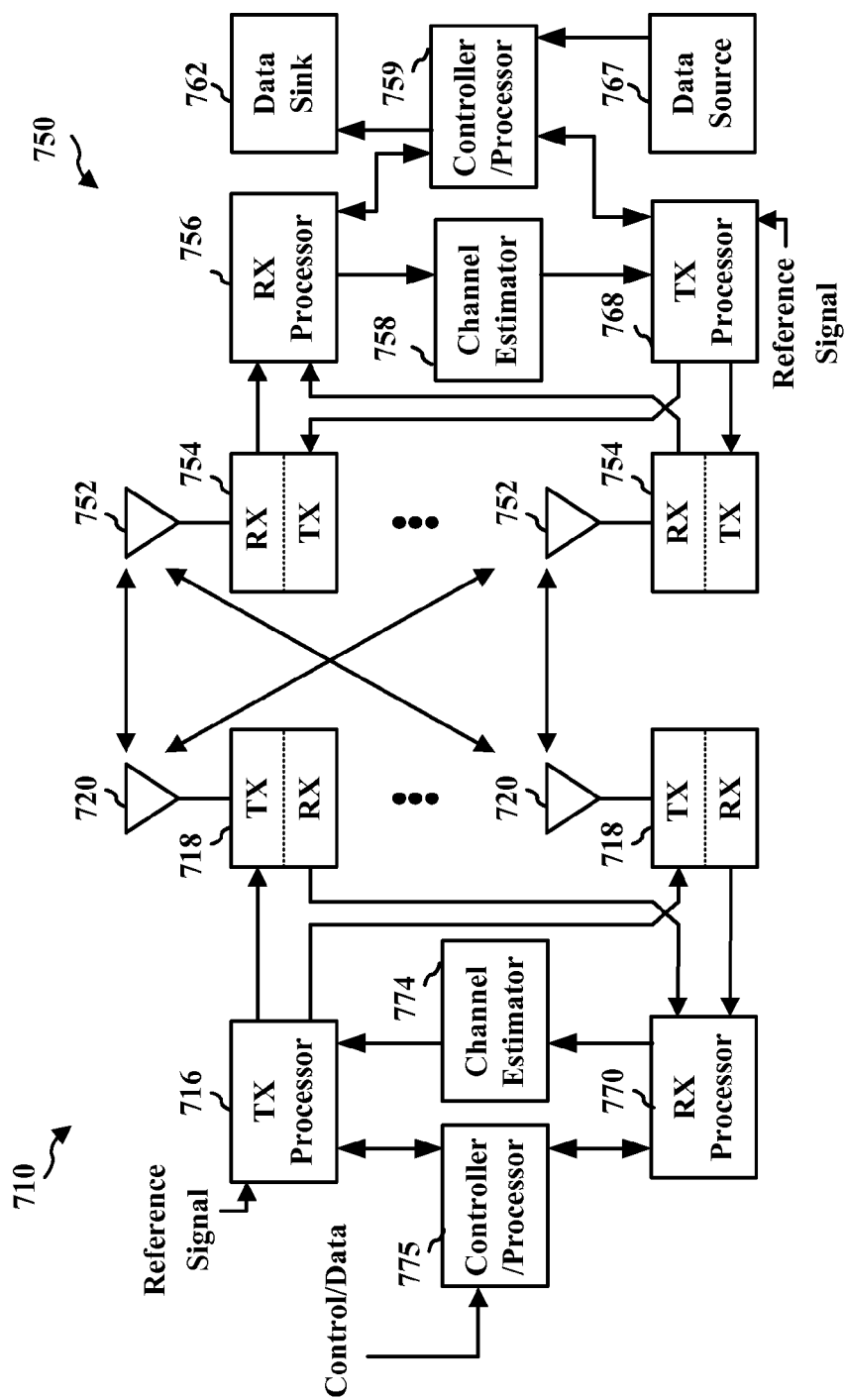
FIG. 7 is a diagram illustrating an example of an evolved Node B and user equipment in an access network.

FIG. 7 is a block diagram of an eNB 710 in communication with a UE 750 in an access network. In the DL, upper layer packets from the core network are provided to a controller/processor 775. The controller/processor 775 implements the functionality of the L2 layer described earlier in connection with FIG. 6. In the DL, the controller/processor 775 provides header compression, ciphering, packet segmentation and reordering, multiplexing between logical and transport channels, and radio resource allocations to the UE 750 based on various priority metrics. The controller/processor 775 is also responsible for HARQ operations, retransmission of lost packets, and signaling to the UE 750.

The TX processor 716 implements various signal processing functions for the L1 layer (i.e., physical layer). The signal processing functions includes coding and interleaving to facilitate forward error correction (FEC) at the UE 750 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 774 may be used to determine the coding and modulation scheme, as well as for spatial processing. The channel estimate may be derived from a reference signal and/or channel condition feedback transmitted by the UE 750. Each spatial stream is then provided to a different antenna 720 via a separate transmitter 718TX. Each transmitter 718TX modulates an RF carrier with a respective spatial stream for transmission.

At the UE 750, each receiver 754RX receives a signal through its respective antenna 752. Each receiver 754RX recovers information modulated onto an RF carrier and provides the information to the receiver (RX) processor 756.

The RX processor 756 implements various signal processing functions of the L1 layer. The RX processor 756 performs spatial processing on the information to recover any spatial streams destined for the UE 750. If multiple spatial streams are destined for the UE 750, they may be combined by the RX processor 756 into a single OFDM symbol stream. The RX processor 756 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 710. These soft decisions may be based on channel estimates computed by the channel estimator 758. The soft decisions are then decoded and deinterleaved to recover the data and control signals that were originally transmitted by the eNB 710 on the physical channel. The data and control signals are then provided to the controller/processor 759.

The controller/processor 759 implements the L2 layer described earlier in connection with FIG. 6. In the UL, the control/processor 759 provides demultiplexing between transport and logical channels, packet reassembly, deciphering, header decompression, control signal processing to recover upper layer packets from the core network. The upper layer packets are then provided to a data sink 762, which represents all the protocol layers above the L2 layer. Various control signals may also be provided to the data sink 762 for L3 processing. The controller/processor 759 is also responsible for error detection using an acknowledgement (ACK) and/or negative acknowledgement (NACK) protocol to support HARQ operations.

In the UL, a data source 767 is used to provide upper layer packets to the controller/processor 759. The data source 767 represents all protocol layers above the L2 layer (L2). Similar to the functionality described in connection with the DL transmission by the eNB 710, the controller/processor 759 implements the L2 layer for the user plane and the control plane by providing header compression, ciphering, packet segmentation and reordering, and multiplexing between logical and transport channels based on radio resource allocations by the eNB 710. The controller/processor 759 is also responsible for HARQ operations, retransmission of lost packets, and signaling to the eNB 710.

Channel estimates derived by a channel estimator 758 from a reference signal or feedback transmitted by the eNB 710 may be used by the TX processor 768 to select the appropriate coding and modulation schemes, and to facilitate spatial processing. The spatial streams generated by the TX processor 768 are provided to different antenna 752 via separate transmitters 754TX. Each transmitter 754TX modulates an RF carrier with a respective spatial stream for transmission.

The UL transmission is processed at the eNB 710 in a manner similar to that described in connection with the receiver function at the UE 750. Each receiver 718RX receives a signal through its respective antenna 720. Each receiver 718RX recovers information modulated onto an RF carrier and provides the information to a RX processor 770. The RX processor 770 implements the L1 layer.

The controller/processor 759 implements the L2 layer described earlier in connection with FIG. 6. In the UL, the control/processor 759 provides demultiplexing between transport and logical channels, packet reassembly, deciphering, header decompression, control signal processing to recover upper layer packets from the UE 750. Upper layer packets from the controller/processor 775 may be provided to the core network. The controller/processor 759 is also responsible for error detection using an ACK and/or NACK protocol to support HARQ operations.

The processing system 114 described in relation to FIG. 1 includes the UE 750. In particular, the processing system 114 includes the TX processor 768, the RX processor 756, and the controller/processor 759.

FIG. 8 is a diagram 800 illustrating continuous carrier aggregation. FIG. 9 is a diagram 900 illustrating non-continuous carrier aggregation. UEs may use spectrum of up to 20 MHz bandwidths allocated in a carrier aggregation of up to a total of 100 MHz (5 component carriers) used for UL and DL transmission. Generally, less traffic is transmitted on the UL than the DL, so the UL spectrum allocation may be smaller than the DL allocation. For example, if 20 MHz is assigned to the UL, the DL may be assigned 100 MHz. Aggregation of the component carriers may be continuous, non-continuous, or some combination thereof. As shown in FIG. 8, the component carriers may be continuous such that the component carriers are adjacent to each other in frequency. As shown in FIG. 9, the component carriers may be non-continuous such that the component carriers are separated along the frequency band.

FIG. 10 is a diagram 1000 illustrating a positive power headroom report. FIG. 11 is a diagram 1050 illustrating a negative power headroom report (PHR). The PHR reports the available headroom available at the UE. Power headroom provides an indication of how far from the rated power the power amplifier has to operate before it enters a non-linear region of operation. The PHR is transmitted from the UE to the eNB in order to inform the eNB about transmission power abilities or limitations at the UE. Information concerning the power spectral density used at the UE is provided by the PHR. The PHR is encoded as six bits with a reporting range from +40 dB to −23 dB in 1 dB increments. A total of 64 different power headroom values are represented by the 6-bit signaling. The negative part of the reporting range is used by the UE to signal to the eNB the extent to which the uplink resource grant it received needs more transmission power than a current UE transmit power 1002. In response, the eNB may reduce the size of a subsequent grant. As shown in FIG. 10, a positive PHR 1004 indicates the difference between the maximum UE transmit power (also known as $P_{CMAX}$) 1006 and a current UE transmit power 1002. As shown in FIG. 11, a negative PHR 1054 indicates the difference between the maximum UE transmit power 1056 and the calculated UE transmit power 1052. The UE transmit power is calculated based on if the UE were to transmit according to the current grant with allocated HARQ and Redundancy Version (RV) configuration.

Figure 12:
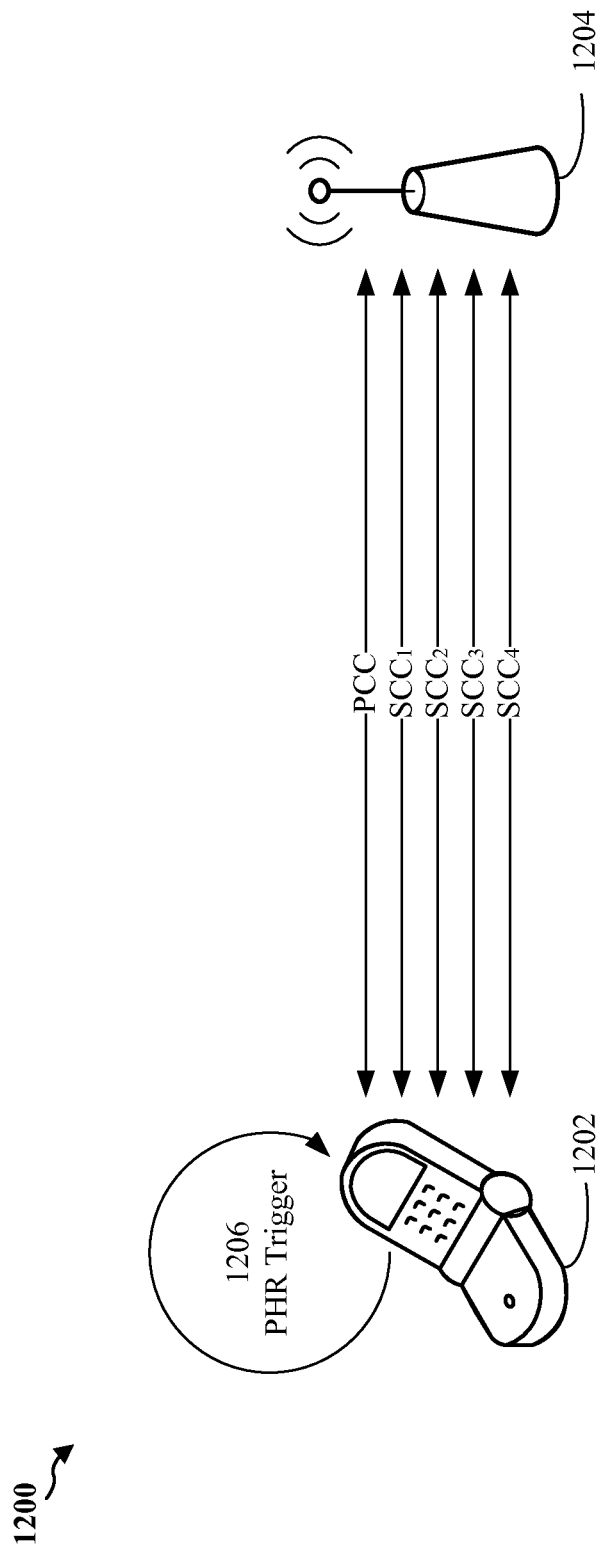
FIG. 12 is a diagram for illustrating an exemplary method of wireless communication.

FIG. 12 is a diagram 1200 for illustrating an exemplary method of wireless communication. In a multi-carrier LTE system, a UE 1202 can be assigned one or more component carriers. One of the component carriers is a primary component carrier (PCC), which is in an exemplary method and apparatus more reliable and robust than the remaining component carriers. The remaining component carriers are called secondary component carriers (SCCs). Component carriers may also be referred to as serving cells. The PCC may also be referred to as the primary cell (PCell) and each SCC may also be referred to as a secondary cell (SCell). According to an exemplary method and apparatus, the UE 1202 may use the power headroom reporting procedure to provide the eNB 1204 with a PHR that includes information about a difference between the nominal UE maximum transmit power and the estimated power for the PCC and for each activated SCC.

The PHR can be triggered (1206) if any of the following events occur:
    (i). a prohibit PHR timer expires or has expired and a DL path loss has changed by more than a threshold for at least one activated component carrier that is used as a DL path loss reference since the last transmission of a PHR when the UE has UL resources for the new transmission;
    (ii). a periodic PHR timer expires after a predefined period of time;
    (iii). upon configuration or reconfiguration of the power headroom reporting functionality by the RRC layer, which is not used to disable the function;
    (iv). activation of a SCC with configured UL; or
    (v). the prohibit PHR timer expires or has expired and a power backoff allowed by a power management maximum power reduction (P-MPR) for at least one activated component carrier with configured UL has changed by more than a threshold since the last transmission of a PHR when the UE has UL resources for the new transmission. Maximum power reduction (MPR) may be defined by the associated wireless communications protocol (e.g., 3GPP standards) to control how much a power amplifier backs off from a maximum transmission power (MTP), or used to adjust the MTP, in order to establish a modified MTP which is used during the transmission of the corresponding waveform.

The P-MPR value may affect a $P_{CMAX\_L}$, which is a lower bound of $P_{CMAX}$. Additional triggers may be possible. In one configuration, a PHR may be triggered when the UE's power headroom is limited (such that the UE has to scale the transmission power of the UL channels). In multicarrier LTE, when the UE runs out of power headroom (i.e., the headroom 804 is small or a negative headroom 854 is reported), the UE 1202 can apply some rules to reduce the UL channels individually. In such a situation, sending a PHR would be useful, as informing the eNB 1204 about the situation would be beneficial. In another configuration, in order to help the scheduler of the eNB 1204, a PHR may be triggered when the power headroom changes since the last report exceeds a configurable threshold. The threshold may be configured by the eNB 1204.

Once the PHR is triggered (1206), the UE will send the PHR in the next PUSCH transmission. The reported power headroom is calculated over the subframe where the PUSCH is transmitted. As discussed supra, the power headroom is defined as the difference between the configured maximum UE output power ($P_{CMAX}$) and the estimated power for PUSCH transmission.

Described infra are different configurations for sending the PHR, each with different complexity and efficiency tradeoffs. In a first embodiment, the UE 1202 maintains one or more separate triggers for each activated component carrier. In this embodiment, the UE 1202 maintains a plurality of timers for each activated component carrier. For example, if the PCC, $SCC_1$, and $SCC_3$ are activated, the UE maintains a periodic PHR timer and a prohibit PHR timer for each of the PCC, the $SCC_1$, and the $SCC_3$. In a first configuration of the first embodiment (option #1), upon the trigger 1206 of a PHR for a particular component carrier, an individual PHR is transmitted for the particular component carrier (when PUSCH is present). In a second configuration of the first embodiment (option #2), upon the trigger 1206 of a PHR for a particular component carrier, an aggregated (or joint) PHR is transmitted for the particular component carrier and all other component carriers that had their corresponding PHR triggered in the intervening time before the next available PUSCH transmission. A PHR for the PCC may always be included or may be included only if the PHR for the PCC has been triggered. In such a configuration, the aggregated PHR includes for each of the component carriers, an index or otherwise information indicating whether a PHR is included for the component carrier. Furthermore, the aggregated PHR includes information indicating whether the PHR was computed based on a real PUSCH transmission or on a reference format.

In a second embodiment, the UE 1202 maintains one or more common triggers for all the activated component carriers. In such a configuration, a PHR may be triggered 1206 based on the events (i) through (v), discussed supra. In this embodiment the UE 1202 maintains a plurality of timers for all activated component carriers. For example, if the PCC, $SCC_1$, and $SCC_3$ are activated, the UE must maintain one periodic PHR timer and one prohibit PHR timer for the PCC, the $SCC_1$, and the $SCC_3$. In a first configuration of the second embodiment (option #3), upon the trigger 1206 of a PHR, the UE 1202 sends a PHR individually for all component carriers that have a PUSCH transmission. For example, assume that PCC, $SCC_1$, and $SCC_3$ are activated and that one of events (i) through (v) occurs to trigger 1206 a PHR. If PCC and $SCC_1$ have a PUSCH transmission, then the UE 1202 would send a first PHR on the PCC and a second PHR on the $SCC_1$. In a second configuration of the second embodiment (option #4), upon the trigger 1206 of a PHR, the UE 1202 sends an aggregate (or joint) PHR for all component carriers that have a PUSCH transmission. As such, if PCC, $SCC_1$, and $SCC_3$ are activated, one of events (i) through (v) occurs to trigger 1206 a PHR, and the PCC and the $SCC_1$ have a PUSCH transmission, the UE 1202 would send an aggregate PHR that includes PHR information for the PCC and $SCC_1$. The aggregate PHR may be sent on either the PCC or the $SCC_1$ based on for which of the PCC or the $SCC_1$ that UE received an UL grant to send the PHR.

In a third configuration of the second embodiment (option #5), upon the trigger 1206 of a PHR, the UE 1202 sends an aggregate (or joint) PHR for all activated component carriers regardless of whether they have a PUSCH transmission. In this configuration, the aggregated PHR may include for each of the component carriers, an index or otherwise information indicating whether a PHR is included for the component carrier. A PHR for the PCC may always be included. If a PHR for the PCC is always included, the index to indicate whether a power headroom is being reported may be included only for the activated SCCs. Furthermore, the aggregated PHR may include information indicating whether the PHR was computed based on a real PUSCH transmission or on a reference format. The UE 1202 transmits the aggregated PHR in an extended power headroom MAC control element discussed infra with respect to FIG. 13.

Figure 13:
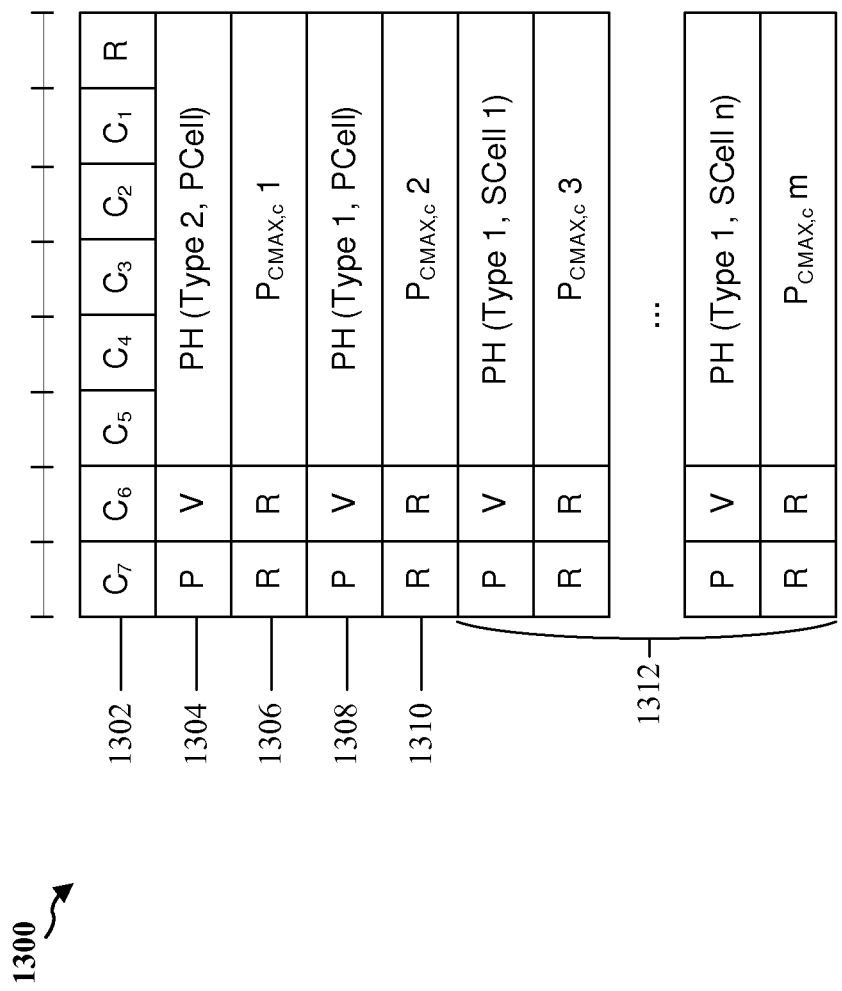
FIG. 13 is a diagram illustrating an exemplary extended power headroom media access control (MAC) control element.

FIG. 13 is a diagram 1300 illustrating an exemplary extended power headroom MAC control element. As shown in FIG. 13, the extended power headroom MAC control element includes a bitmap (i.e., set of indexes) $C_i$ for i=1, 2, . . . , 7, for indicating the presence of a power headroom field for an SCC. The indices $C_7$, $C_6$, $C_5$ allow for the additional configurations of SCCs (greater than a total of four SCCs). A $C_i$ field set to "1" may indicate that the power headroom field for the corresponding SCC is reported and a field set to "0" may indicate that the power headroom field for the corresponding SCC is not reported. For example, if the UE 1202 is configured with $SCC_1$ and $SCC_3$ (i.e., both the $SCC_1$ and the $SCC_3$ are activated) and the remaining SCCs are deactivated, then $C_7C_6C_5C_4C_3C_2C_1$=0000101. The bitmap may also include a reserve bit R that is set to "0." Together these 8 bits may be referred to as an octet 1302. Following the octet 1302 indicating the presence of power headroom per SCC, an octet 1304 containing a type 2 power headroom field may be included if the PCC has simultaneous PUSCH and PUCCH transmissions. The octet 1304 includes a P bit, a V bit, and 6 bits for indicating a power headroom level of 64 different power headroom values. The P bit indicates whether the UE 1202 applies a power backoff due to power management as allowed by the P-MPR. The UE 1202 sets P=1 if the corresponding current maximum UE output power $P_{CMAX,c}$ would have had a different value if no additional power management had been applied. The V bit indicates if the PH value is based on a real transmission or a reference format. For the type 2 power headroom field, V=0 indicates a real transmission on PUCCH and that the associated $P_{CMAX,c}$ 1 field is included and V=1 indicates that a PUCCH reference format is used and that the associated $P_{CMAX,c}$ 1 field is omitted. The octet 1306 contains reserve bits R and $P_{CMAX,c}$ 1, which is the $P_{CMAX,c}$ value associated with the type 2 power headroom field.

The octets 1308, 1310 contain a P bit, V bit, type 1 power headroom field, reserve bits R, and an associated $P_{CMAX,c}$ field. The type 1 power headroom field is for when the PCC has a PUSCH transmission. The type 1 power headroom field is always included in the extended power headroom MAC control element. The P bit indicates whether the UE 1202 applies a power backoff due to power management as allowed by the P-MPR. The UE 1202 sets P=1 if the corresponding current maximum UE output power $P_{CMAX,c}$ would have had a different value if no additional power management had been applied. The V bit indicates if the PH value is based on a real transmission or a reference format. For the type 1 power headroom field, V=0 indicates a real transmission on PUSCH and that the associated $P_{CMAX,c}$ 2 field is included and V=1 indicates that a PUSCH reference format is used and that the associated $P_{CMAX,c}$ 2 field is omitted.

The remaining octets 1312 include P bits, V bits, power headroom fields, reserve bits R, and the associated $P_{CMAX,c}$ fields for the SCCs indicated as being present in the octet 1302. The P bit indicates whether the UE 1202 applies a power backoff due to power management as allowed by the P-MPR. The UE 1202 sets P=1 if the corresponding current maximum UE output power $P_{CMAX,c}$ would have had a different value if no additional power management had been applied. The V bit indicates if the PH value is based on a real transmission (i.e., V=0) or a reference format (i.e., V=1).

Figure 14A:
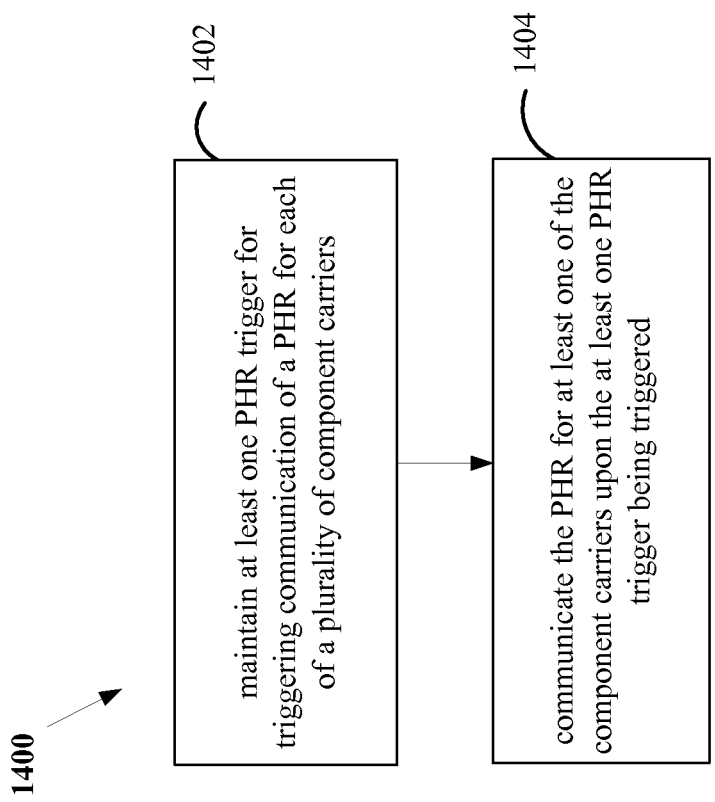
FIG. 14A is a flow chart of a first configuration of a first embodiment of sending a PHR.
Figure 14B:
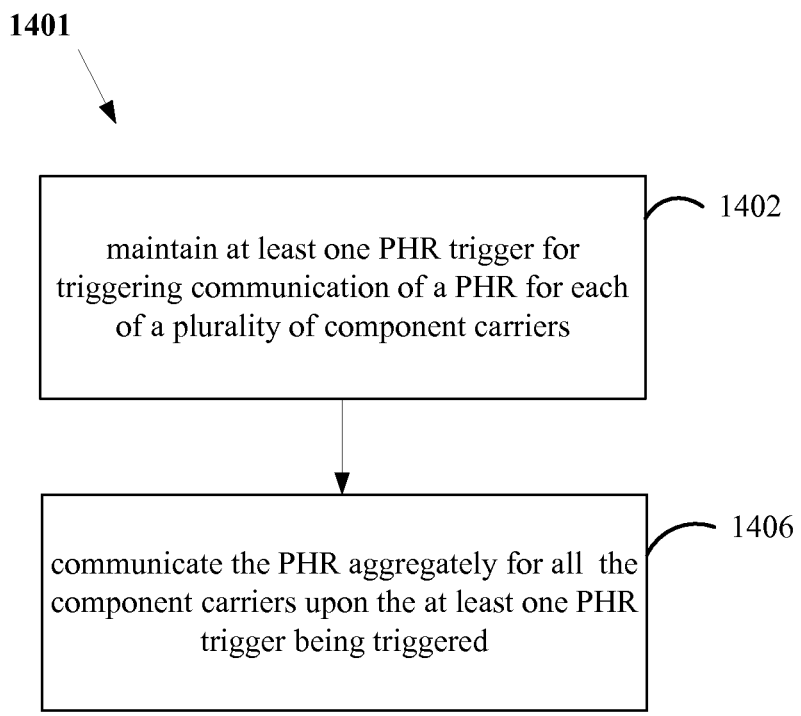
FIG. 14B is a flowchart of a second configuration of a first embodiment of sending a PHR.

FIG. 14A is a flow chart 1400 of a method of wireless communication disclosing the first configuration of the first embodiment disclosed earlier. The method is performed by a UE, such as the UE 1202. According to the method, the UE 1202 maintains at least one PHR trigger (e.g., events (i) through (v)) for triggering communication of a PHR for each of a plurality of component carriers (1402). In addition, the UE 1202 communicates the PHR for at least one of the component carriers upon the at least one PHR trigger being triggered (1404). FIG. 14B is a flowchart 1401 of the second configuration of the first embodiment disclosed earlier wherein upon the trigger 1206 of a PHR for a particular component carrier, an aggregated (or joint) PHR is transmitted for the at least one component carrier where the at least one of the component carriers includes activated component carriers and the UE 1202 communicates the PHR aggregately for all the activated component carriers upon one of the at least one PHR trigger being triggered (1406). In one configuration, the at least one of the component carriers always includes a PCC such that the communicated PHR always includes power headroom information for the PCC. For example, the extended power headroom MAC control element may always include the type 1 power headroom field in the octet 1308. In one configuration, the communicated PHR includes, for each of the at least one of the component carriers that is an SCC, an index associating information in the PHR to a corresponding component carrier. For example, the octet 1302 includes an index indicating whether a power headroom level is reported for each of the SCCs. In one configuration, the communicated PHR includes, for each of said at least one of the component carriers on which there is no PUSCH transmission, information indicating use of a PUSCH reference for computing the PHR. For example, for each of the component carriers, the V bits in the fields in FIG. 13 indicate whether the power headroom value is based on a real transmission or a reference format.

Figure 14C:
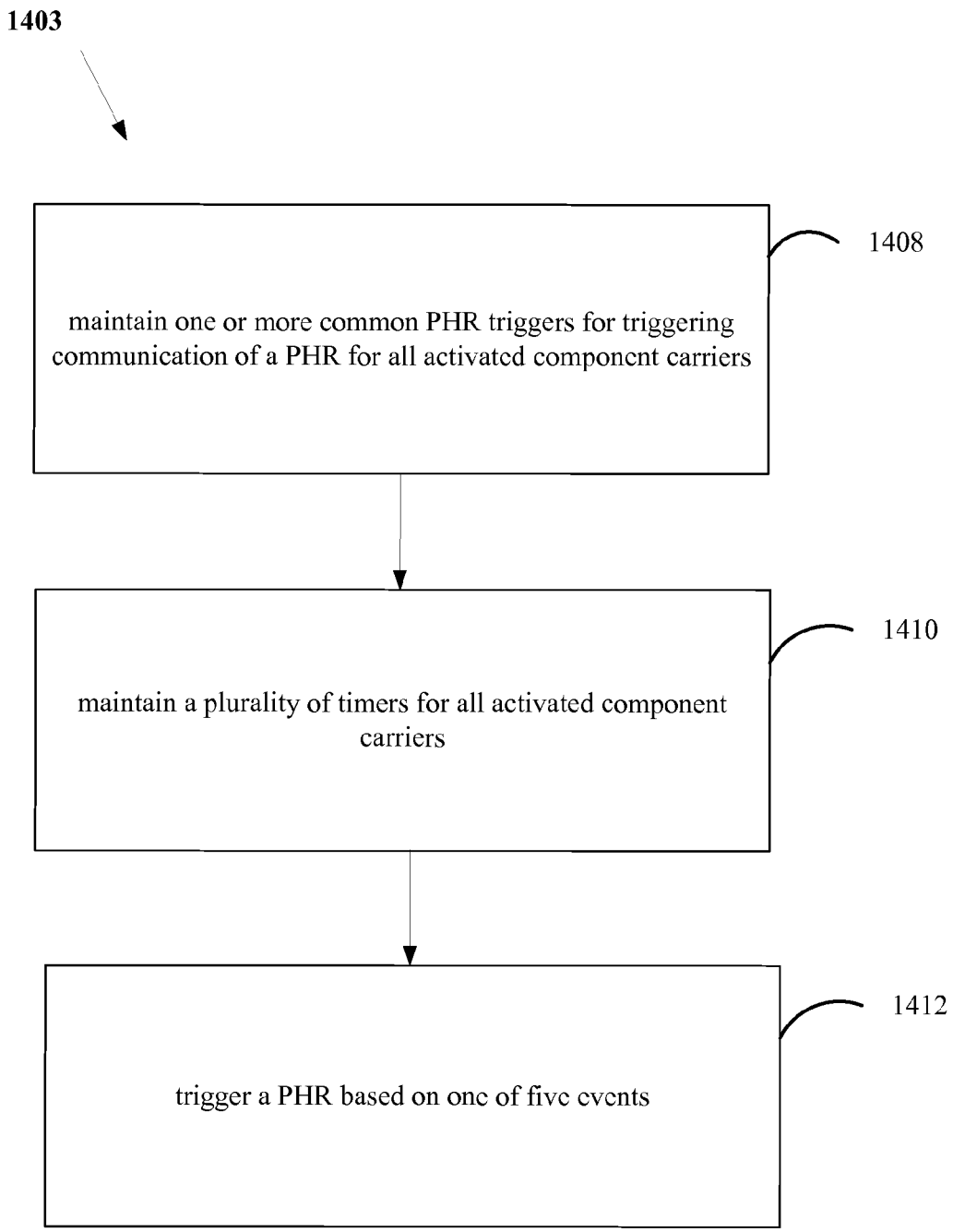
FIG. 14C is a flowchart of a second embodiment of sending a PHR.

FIG. 14C is a flowchart 1403 of the second embodiment disclosed earlier, wherein the UE 1202 maintains one or more common PHR triggers for all the activated component carriers (1408). In such a configuration, a PHR may be triggered 1206 based on the 5 events discussed supra (1412). In this embodiment, the UE 1202 maintains a plurality of timers for all activated component carriers (1410).

Figure 14D:
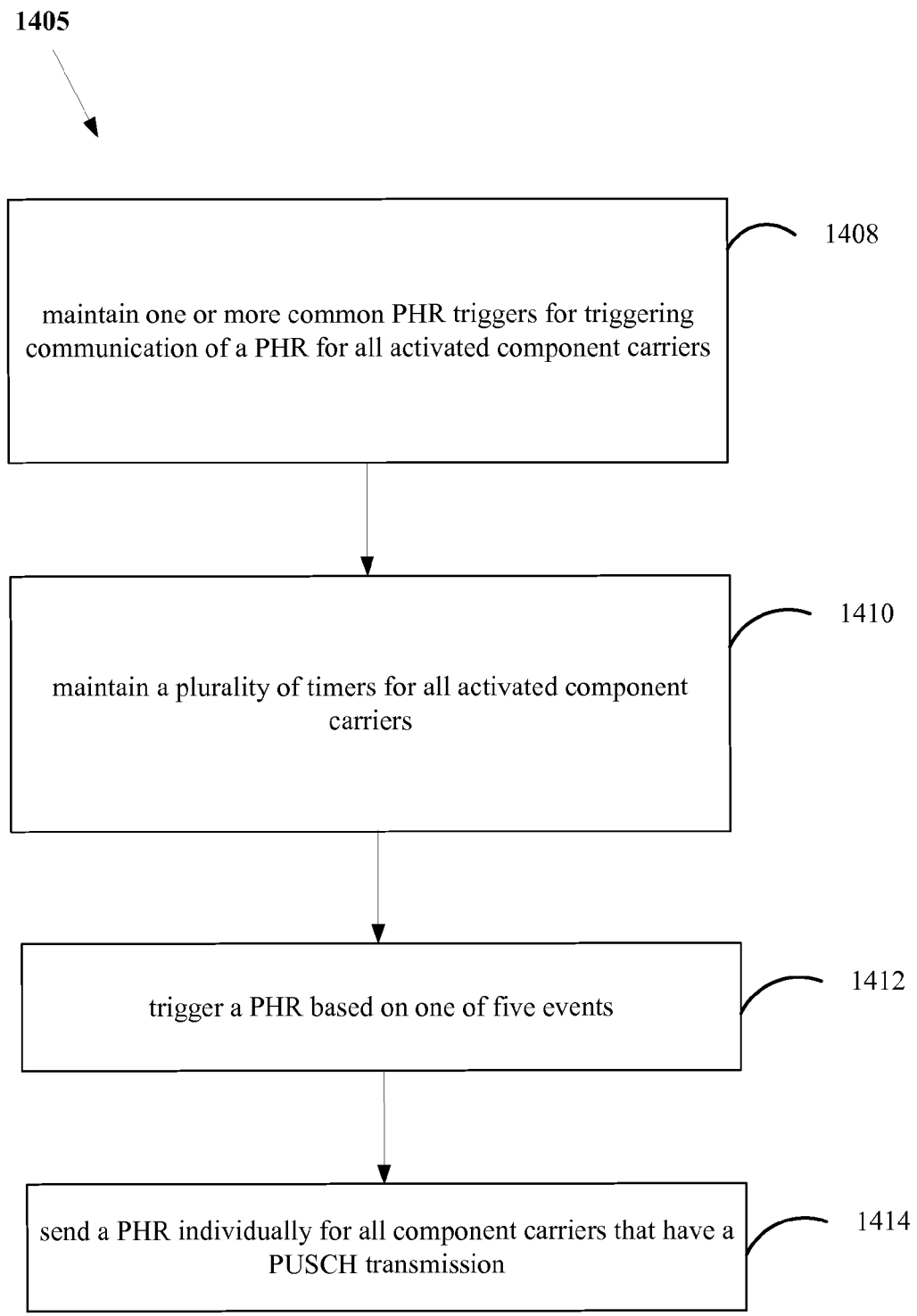
FIG. 14D is a flowchart of a first configuration of a second embodiment of sending a PHR.

FIG. 14D is a flowchart 1405 of the first configuration of the second embodiment disclosed earlier, wherein upon the trigger 1206 of a PHR (1412), the UE 1202 sends a PHR individually for all component carriers that have a PUSCH transmission (1414).

Figure 14E:
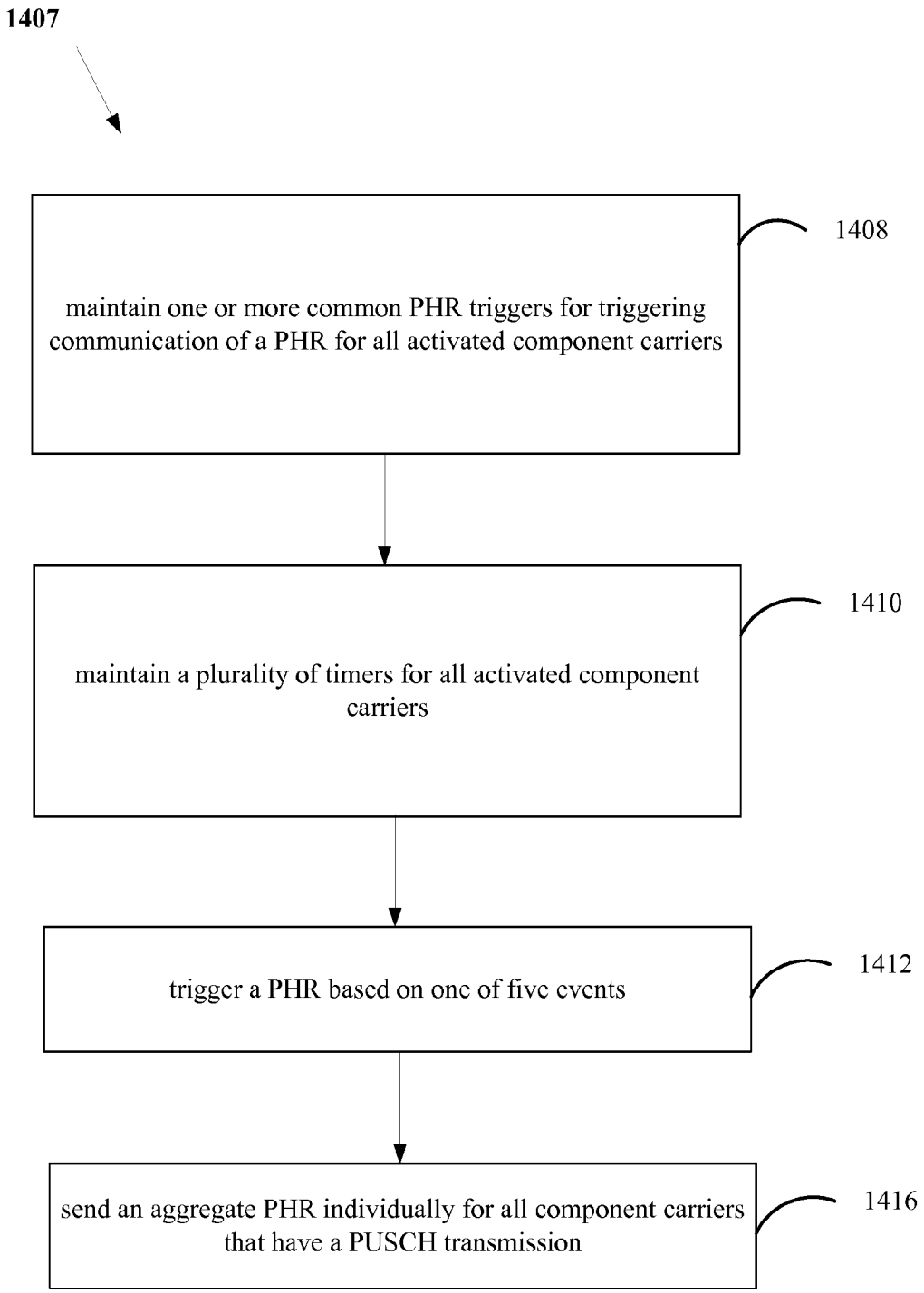
FIG. 14E is a flowchart of a second configuration of a second embodiment of sending a PHR.

FIG. 14E is a flowchart 1407 of the second configuration of the second embodiment disclosed earlier wherein upon the trigger 1206 of a PHR (1412), the UE 1202 sends an aggregate (or joint) PHR for all component carriers that have a PUSCH transmission (1416).

Figure 14F:
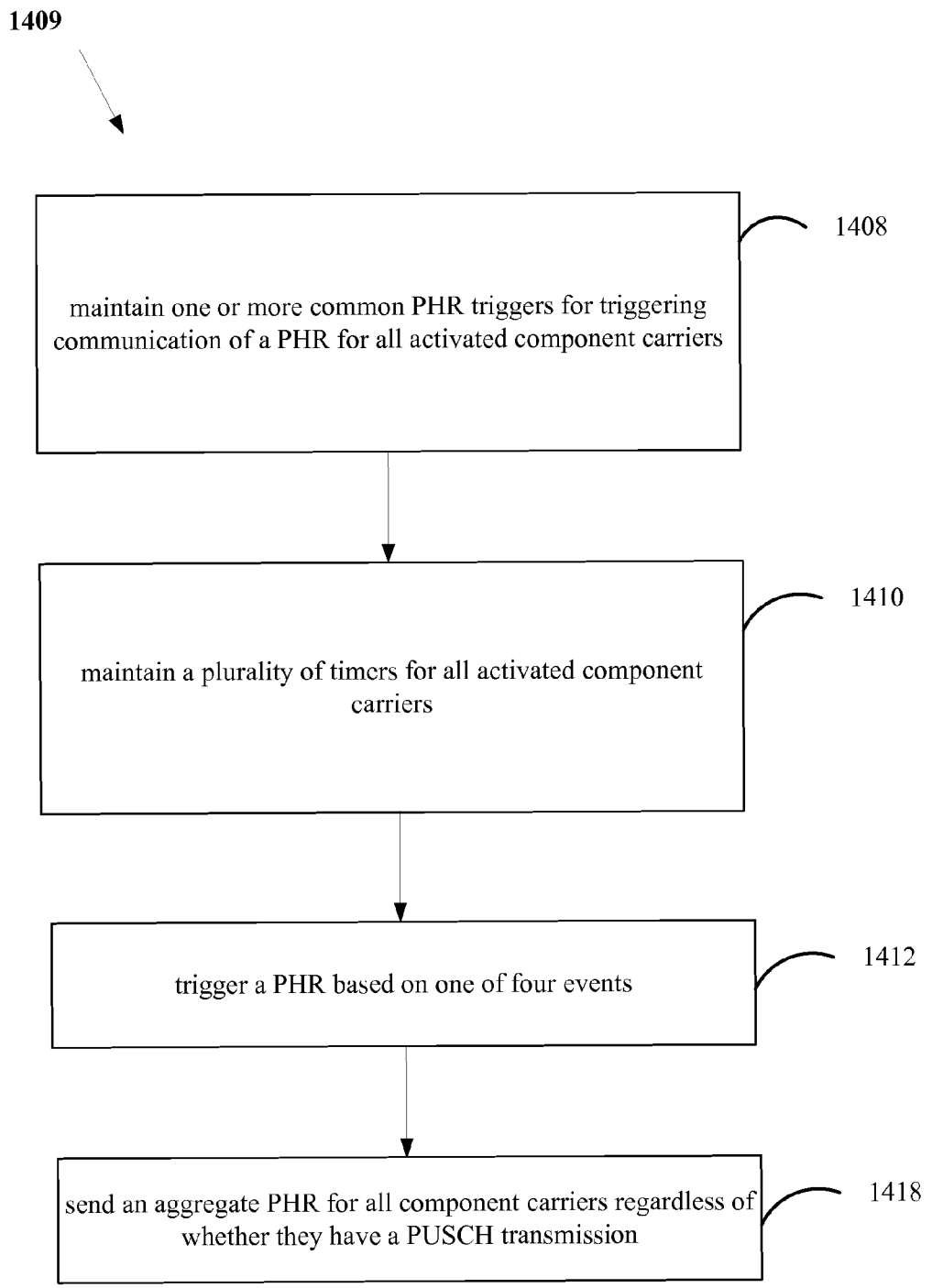
FIG. 14F is a flowchart of a third configuration of a second embodiment of sending a PHR.

FIG. 14F is a flowchart 1409 of the third configuration of the second embodiment disclosed earlier, wherein upon the trigger 1206 of a PHR, the UE 1202 sends an aggregate (or joint) PHR for all activated component carriers regardless of whether they have a PUSCH transmission in an extended power headroom MAC control element (1418).

Figure 15:
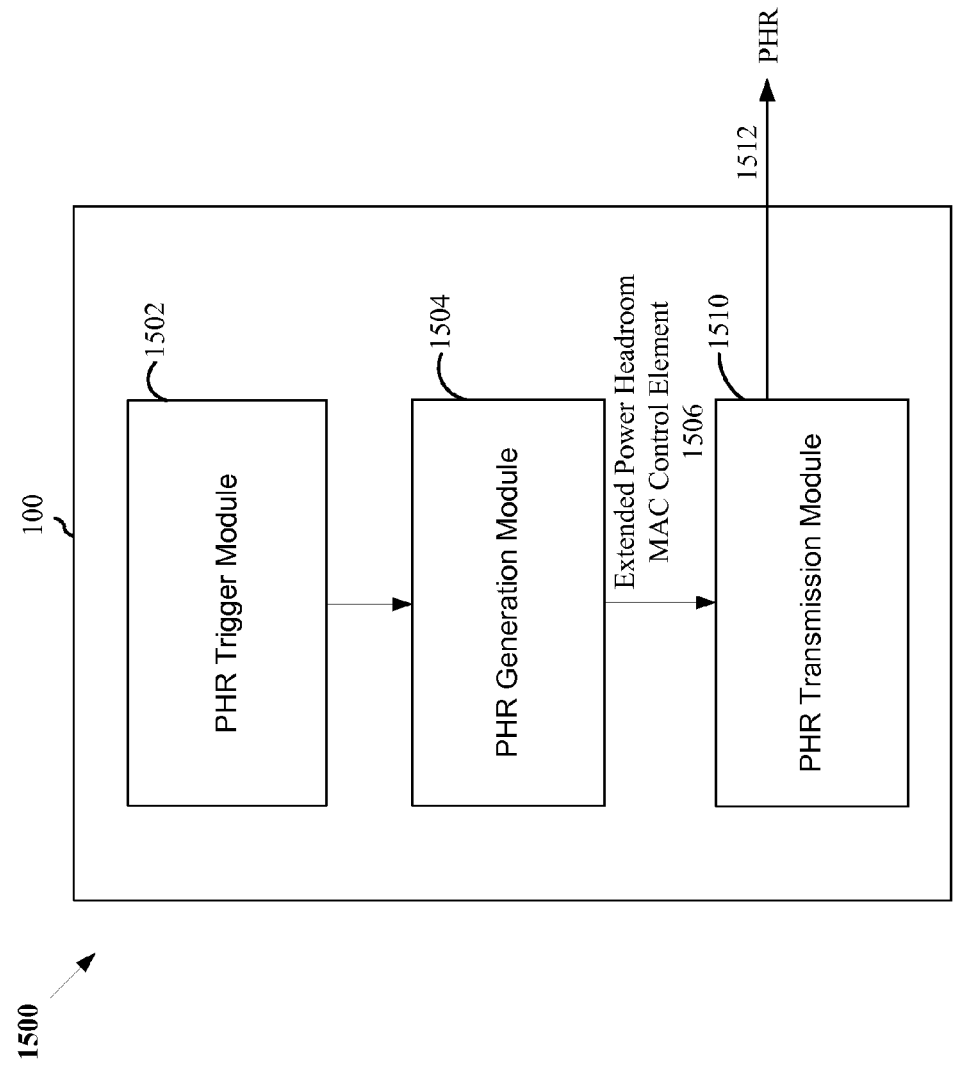
FIG. 15 is a conceptual block diagram illustrating the functionality of an exemplary apparatus.

FIG. 15 is a conceptual block diagram 1500 illustrating the functionality of an exemplary apparatus 100. The apparatus 100 includes a PHR trigger module 1502 that is configured to maintain at least one PHR trigger for triggering communication of a PHR for each of a plurality of component carriers. The at least one PHR trigger may include the triggers (i) through (v), discussed supra. The apparatus 100 further includes a PHR transmission module 1510 that is configured to communicate the PHR 1512 for at least one of the component carriers upon the at least one PHR trigger being triggered. The apparatus 100 may further include a PHR generation module 1504 that generates a PHR upon the PHR being triggered in the PHR trigger module 1502. The PHR generation module 1504 is configured to generate the extended power headroom MAC control element 1506, which is an aggregate PHR that includes power headroom information for the PCC and activated SCCs. The PHR generation module 1504 is configured to include in the extended power headroom MAC control element 1506, an index associating information in the PHR to a corresponding component carrier for each of the activated SCCs. Furthermore, the PHR generation module 1504 is configured to include in the extended power headroom MAC control element 1506, information indicating use of a PUSCH reference for computing the PHR for each of the component carriers on which there is no PUSCH transmission.

In one configuration, the apparatus 100 for wireless communication includes means for maintaining at least one PHR trigger for triggering communication of a PHR for each of a plurality of component carriers. In addition, the apparatus 100 includes means for communicating the PHR for at least one of the component carriers upon the at least one PHR trigger being triggered. The aforementioned means may be one or more of the aforementioned modules of the apparatus 100 (see FIG. 15) and/or the processing system 114 configured to perform the functions recited by the aforementioned means. As described supra, the processing system 114 includes the TX Processor 768, the RX Processor 756, and the controller/processor 759. As such, in one configuration, the aforementioned means may be the TX Processor 768, the RX Processor 756, and the controller/processor 759 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
   maintaining at least one power headroom report (PHR) trigger for triggering communication of a PHR for a plurality of component carriers; and
   communicating the PHR for at least one of the component carriers upon the at least one PHR trigger being triggered,
   wherein the communicated PHR includes, for said at least one of the component carriers on which there is no physical uplink shared channel (PUSCH) transmission, at least one bit indicating whether the PHR is computed based on a PUSCH reference or a real PUSCH transmission.

2. The method of claim 1, wherein said at least one of the component carriers comprises activated component carriers and the communicating comprises communicating the PHR aggregately for all the activated component carriers upon one of said at least one PHR trigger being triggered.

3. The method of claim 1, wherein said at least one of the component carriers includes a primary component carrier (PCC) such that the communicated PHR includes power headroom information for the PCC.

4. The method of claim 1, wherein the communicated PHR includes, for said at least one of the component carriers that is a secondary component carrier, an index associating information in the PHR to a corresponding component carrier.

5. The method of claim 1, wherein said maintaining the at least one PHR trigger for triggering communication of a PHR is done for each of the plurality of component carriers.

6. An apparatus for wireless communication, comprising:
  means for maintaining at least one power headroom report (PHR) trigger for triggering communication of a PHR for a plurality of component carriers; and
  means for communicating the PHR for at least one of the component carriers upon the at least one PHR trigger being triggered,
  wherein the communicated PHR includes, for said at least one of the component carriers on which there is no physical uplink shared channel (PUSCH) transmission, at least one bit indicating whether the PHR is computed based on a PUSCH reference or a real PUSCH transmission.

7. The apparatus of claim 6, wherein said at least one of the component carriers comprises activated component carriers and the means for communicating communicates the PHR aggregately for all the activated component carriers upon one of said at least one PHR trigger being triggered.

8. The apparatus of claim 6, wherein said at least one of the component carriers includes a primary component carrier (PCC) such that the communicated PHR includes power headroom information for the PCC.

9. The apparatus of claim 6, wherein the communicated PHR includes, for said at least one of the component carriers that is a secondary component carrier, an index associating information in the PHR to a corresponding component carrier.

10. The apparatus of claim 6, wherein said means for maintaining the at least one PHR trigger for triggering communication of a PHR is done for each of the plurality of component carriers.

11. An apparatus for wireless communication, comprising:
  a memory; and
  at least one processor operably connected to said memory, wherein said at least one processor is configured to:
  maintain at least one power headroom report (PHR) trigger for triggering communication of a PHR for a plurality of component carriers; and
  communicate the PHR for at least one of the component carriers upon the at least one PHR trigger being triggered,
  wherein the communicated PHR includes, for said at least one of the component carriers on which there is no physical uplink shared channel (PUSCH) transmission, at least one bit indicating whether the PHR is computed based on a PUSCH reference or a real PUSCH transmission.

12. The apparatus of claim 11, wherein said at least one of the component carriers comprises activated component carriers and the processing system is configured to communicate the PHR aggregately for all the activated component carriers upon one of said at least one PHR trigger being triggered.

13. The apparatus of claim 11, wherein said at least one of the component carriers includes a primary component carrier (PCC) such that the communicated PHR includes power headroom information for the PCC.

14. The apparatus of claim 11, wherein the communicated PHR includes, for said at least one of the component carriers that is a secondary component carrier, an index associating information in the PHR to a corresponding component carrier.

15. The apparatus of claim 11, wherein said at least one processor is configured to maintain said at least one PHR trigger for triggering communication of a PHR for each of the plurality of component carriers.

16. A computer program product, comprising:
  a non-transitory computer-readable medium comprising code for:
  maintaining at least one power headroom report (PHR) trigger for triggering communication of a PHR for a plurality of component carriers; and
  communicating the PHR for at least one of the component carriers upon the at least one PHR trigger being triggered,
  wherein the communicated PHR includes, for said at least one of the component carriers on which there is no physical uplink shared channel (PUSCH) transmission, at least one bit indicating whether the PHR is computed based on a PUSCH reference or a real PUSCH transmission.

17. The computer program product of claim 16, wherein said at least one of the component carriers comprises activated component carriers and the code for communicating communicates the PHR aggregately for all the activated component carriers upon one of said at least one PHR trigger being triggered.

18. The computer program product of claim 16, wherein said at least one of the component carriers includes a primary component carrier (PCC) such that the communicated PHR includes power headroom information for the PCC.

19. The computer program product of claim 16, wherein the communicated PHR includes, for said at least one of the component carriers that is a secondary component carrier, an index associating information in the PHR to a corresponding component carrier.

20. The computer program product of claim 16, wherein said maintaining the at least one PHR trigger for triggering communication of a PHR is done for each of the plurality of component carriers.

* * * * *